United States Patent
Patino et al.

(10) Patent No.: US 6,731,096 B1
(45) Date of Patent: May 4, 2004

(54) BATTERY CHARGING ALGORITHM

(75) Inventors: Joseph Patino, Pembroke Pines, FL (US); John Dewey Fiske, Margate, FL (US)

(73) Assignee: Motorola, Inc., Schaumburg, IL (US)

( * ) Notice: Subject to any disclaimer, the term of this patent is extended or adjusted under 35 U.S.C. 154(b) by 548 days.

(21) Appl. No.: 09/636,126

(22) Filed: Aug. 10, 2000

(51) Int. Cl.[7] .................................................. H02J 7/00
(52) U.S. Cl. ........................................ 320/137; 320/150
(58) Field of Search .............................. 320/150, 153; 701/22, 1

(56) References Cited

U.S. PATENT DOCUMENTS

| | | | | |
|---|---|---|---|---|
| 4,742,290 A | * | 5/1988 | Sutphin et al. ............. | 320/149 |
| 5,329,219 A | * | 7/1994 | Garrett ....................... | 320/150 |
| 5,493,198 A | * | 2/1996 | Kamke ....................... | 320/150 |
| 5,680,031 A | * | 10/1997 | Pavlovic et al. ............ | 320/145 |
| 5,686,808 A | * | 11/1997 | Lutz ........................... | 320/110 |
| 5,767,659 A | * | 6/1998 | Farley ........................ | 320/150 |
| 5,818,202 A | * | 10/1998 | Miyamoto et al. .......... | 320/133 |
| 5,867,008 A | * | 2/1999 | Du et al. .................... | 320/136 |
| 6,137,261 A | * | 10/2000 | Kurle et al. ................. | 320/150 |
| 6,204,632 B1 | * | 3/2001 | Nierescher et al. ......... | 320/116 |

* cited by examiner

*Primary Examiner*—Jessica Han
*Assistant Examiner*—Pia Tibbits
(74) *Attorney, Agent, or Firm*—Philip H. Burrus, IV

(57) ABSTRACT

This invention is a method of charging a battery wherein false dT/dt measurements are identified. When a NiMH battery reaches full charge, the change in temperature per unit time increases. Thus, this dT/dt measurement can be used to properly terminate charging. Initial charging, however, causes a large dT/dt value that may falsely cause charging to terminate. This invention alleviates this condition by adding a wait state and then taking a second dT/dt measurement. As a fully charged battery's temperature briefly continues to rise after charging current is removed, a second, positive dT/dt measurement confirms that the battery has been completely charged to ensure proper charge termination.

9 Claims, 4 Drawing Sheets

BATTERY CHARGING ALGORITHM

TECHNICAL FIELD

This invention relates to battery chargers, and more particularly to battery charging methods.

BACKGROUND

Battery manufacturers use the rise in temperature per unit of time when charging batteries. If one looks at the change in temperature across time, the graphical slope characteristic, known as dT/dt; may be used to determine the battery's charge capacity. As the battery fills with energy, the rise in temperature per second increases. Thus, the dT/dt measurement can be used to cause the charger to switch from rapid charge to trickle charge once a threshold change in temperature slope is detected. This dT/dt termination technique is based on the concept that batteries stay at substantially the same temperature during the charge sequence, and once fully charged, become exothermic—that is, the extra current going into the battery is no longer accepted and turns into heat. Thus, the rise in battery temperature determines when the battery is fully charged.

Two inherent problems exist with this approach. First, batteries that have separate battery contacts for the radio (discharge) and charger (charge) paths, typically contain a reverse discharge diode (in the charge path). This diode is to ensure that an external short of the external contacts won't spark or accidentally drain the battery. The problem with this diode is that it causes temperature problems in the battery. When the charge sequence starts, the rise in temperature created by the diode gets coupled to the cell temperature and can cause the charger to falsely dT/dt. Accordingly, the battery flex circuit must be designed to keep the diode far enough away from the thermistor (which is used to read the battery temperature) to avoid this problem. This typically requires a more design intensive and expensive flex design.

The second problem is that NiMH (nickel-metal hydride) batteries have exothermic characteristics and have a steep temperature slope at the start of charge and at the end of charge. This initial steep temperature slope at the start of charge can cause the charger to falsely terminate rapid charge by reading a misleading dT/dt trip point.

Accordingly, there is a need for an improved battery charging method which properly terminates rapid charge, especially for batteries that contain an additional reverse discharge protection diode, and for NiMH batteries that act exothermic especially at the beginning of the charge sequence.

DETAILED DESCRIPTION OF THE INVENTION

Figure 1:
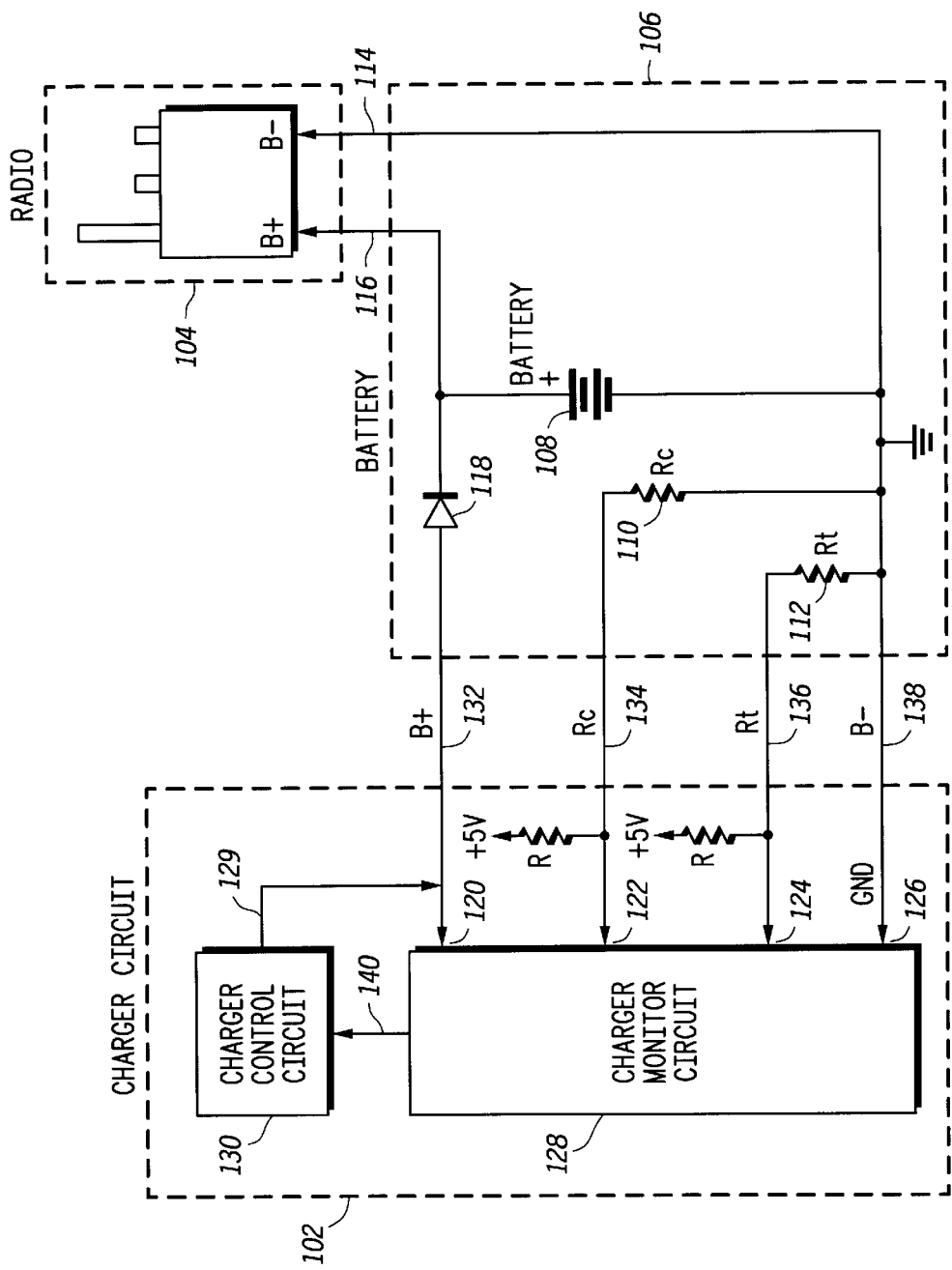
FIG. 1 a prior art charging system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, there is shown a prior art battery charging system described in U.S. Pat. No. 5,411,816 assigned to Motorola, Inc., which is herein incorporated by reference. Charging system 100 includes a charger 102, a battery 106, and a radio 104. The battery 106 includes a B+voltage terminal, a B−voltage terminal, a $R_c$ capacity terminal, and a $R_t$ thermistor terminal for battery temperature. The charger 102 includes control circuitry 130 and monitor circuitry 128 which can read and store battery parameter data through B+, $R_c$, and $R_t$ terminals. The charging routine described herein can be incorporated into this or any number of other chargers, both in controlled and uncontrolled temperature environments.

Briefly, in this invention, a "dT/dt state with I=0" has been added to a charging algorithm after the standard dT/dt termination with the current on has occurred. In simple terms, once a dT/dt trip point has been detected, the current charging the battery is turned off. The monitoring circuitry then waits and checks the dT/dt measurement again. If the temperature is still rising, the charging circuitry knows that the battery is at full capacity as opposed to a beginning charge state.

The dT/dt state with I=0 essentially allows the battery temperature to continue to react once the current has been turned off. If the battery is fully charged when the current is turned off after the standard dT/dt, the temperature of the battery will continue to rise for a given time period, such as 3 minutes. If the battery conversely has prematurely terminated dT/dt because of additional diode heating, or because of the initial steep NiMHi temperature slope, the dT/dt with I=0 temperature rise will not occur and rapid charging can continue without prematurely terminating.

Figure 2:
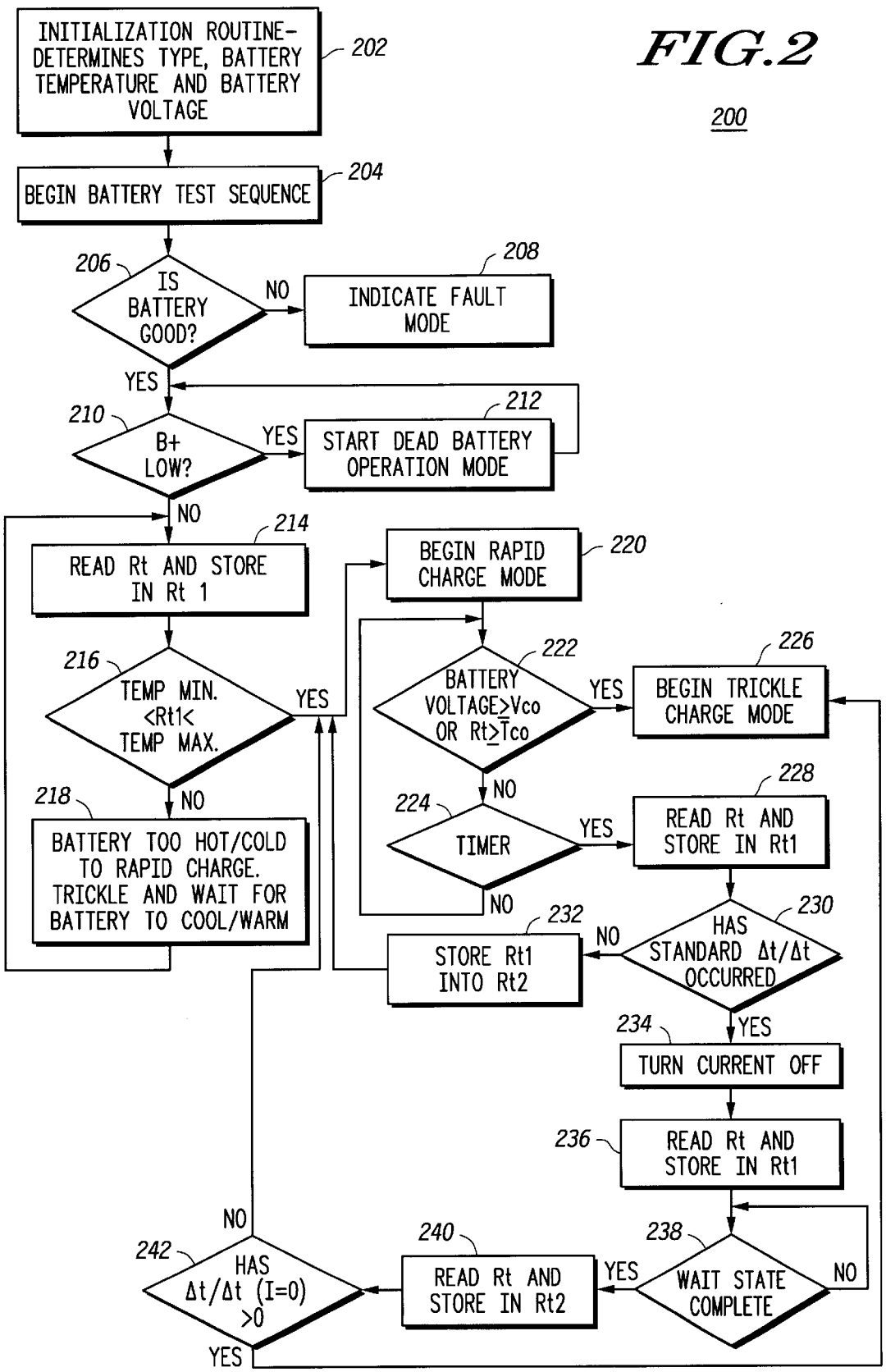
FIG. 2 is a charging routine in accordance with the present invention.

Referring now to FIG. 2, there is shown a flowchart of a charging routine 200 in accordance with the present invention. The charging routine 200 can be used in a number of charger/battery configurations, including the battery/charger configuration shown in FIG. 1. The charging routine 200 begins at step 202 using a battery recognition scheme, known in the art, to determine the battery type, battery temperature and battery voltage. This step can be accomplished, for example, by reading the battery's $R_c$ value, the $R_t$ value, and B+value in a manner known in the art.

A battery test sequence then begins at step 204. The testing is preferably communicated to the user by an indicator such as a red LED on the charger. Step 206 determines if the battery is good by looking at the parameters measured in step 202 and comparing them to predetermined thresholds. If the battery is determined to be bad, a fault mode is indicated, such as a combination green/red LED as shown at step 208. If the battery is determined to be good, the routine goes on to step 210 where the battery voltage is compared to a minimum threshold value. If the battery voltage falls below the predetermined minimum threshold value at step 210, the battery is deemed to be a dead battery and a dead battery charge mode of operation, known in the art, will commence at step 212. Typically, dead battery operation involves rapid charging the battery to quickly get the battery voltage up to a level where the radio will operate. The battery continues to be rapid charged at step 212 and monitored at step 210 until the battery voltage reaches an acceptable value.

Once the battery voltage value reaches an acceptable value at step 210, the routine continues to step 214 where, the charger reads the temperature of the battery and stores the value as $R_{t1}$. The charger then continues to step 216 where it then verifies if the latest battery temperature reading, $R_{t1}$, falls within a predetermined threshold, for example 10–50° Celsius. Rapid charging of the battery occurs at step 220 when the battery temperature falls within the predetermined temperature window at step 216. If the battery temperature exceeds the maximum temperature threshold at step 216, then the battery is too hot to rapid charge, and the charger will continue to trickle charge at step 218. Conversely, if the battery temperature is less than the minimum temperature threshold at step 216, then the battery is too cold to rapid charge, and the charger will continue to trickle charge at step 218. Thus, once the battery temperature falls outside the threshold window set at step 216, the charger will continue to trickle charge the battery until the battery cools down from a hot state or warms up from a cold state before applying rapid charge current.

Once it is determined at step 216 that the stored battery temperature falls within the predetermined temperature window, then rapid charging begins at step 220. The charge routine then proceeds to check, at step 222, whether the battery voltage, B+, has reached or exceeded a maximum voltage cutoff threshold, $V_{co}$, or whether the battery temperature, Rt, has reached or exceeded a maximum temperature cutoff threshold, $T_{co}$. These two conditions are monitored throughout a predetermined time period set at step 224. If either of the $V_{co}$ or $T_{co}$ thresholds has been exceeded, the charger will begin to trickle charge the battery at step 226. The trickle charge condition is preferably indicated to the user through a green LED. If neither the $V_{co}$ nor $T_{co}$ thresholds are exceeded within the predetermined time period, the charger then reads the temperature of the battery at step 228 and stores the value as $R_{t1}$. Next, the charger checks if a dT/dt slope has occurred at step 230. The dT/dt measurement is calculated by taking the difference between the latest stored values of Rt2 (battery temperature at the start of the time period) and Rt1 (battery temp at the end of the time period) over the predetermined time period set by step 224. If the dT/dt slope exceeds a predetermined threshold, such as a 1.8° C. rise over three minutes, then the charger will proceed to step 232 to check if the dT/dt with I=0 is positive before going on to trickle charge the battery. If the dT/dt measurement does not meet the required threshold, the charger will proceed to step 232 and store the Rt1 temperature as Rt2. The charger will then continue rapid charging the battery and return to step 222.

In accordance with the present invention, the charger will turn the current off in step 234. The charger then proceeds to step 236 and reads the temperature of the battery and stores the value as $R_{t2}$. A wait state is then done for a predetermined time period set at step 238. Once the time period set in step 238 is completed, then the charger proceeds to step 240 and reads the temperature of the battery and stores the value as $R_{t1}$. The charger proceeds to step 242 to check if dT/dt with I=0 is positive. The dT/dt with 1=0 measurement is calculated by taking the difference between the latest stored values of $R_{t2}$ (battery temperature at the start of the time period) and $R_{t1}$ (battery temp at the end of the time period) over the predetermined time period set by step 238. If the dT/dt with I=0 slope is positive, then the charger will proceed to step 226 to trickle charge the battery. If the dT/dt with I=0 slope is not positive, then the charger will proceed to step 220 to restart the rapid charge sequence thereby not prematurely terminating the rapid charge sequence.

Figure 3:
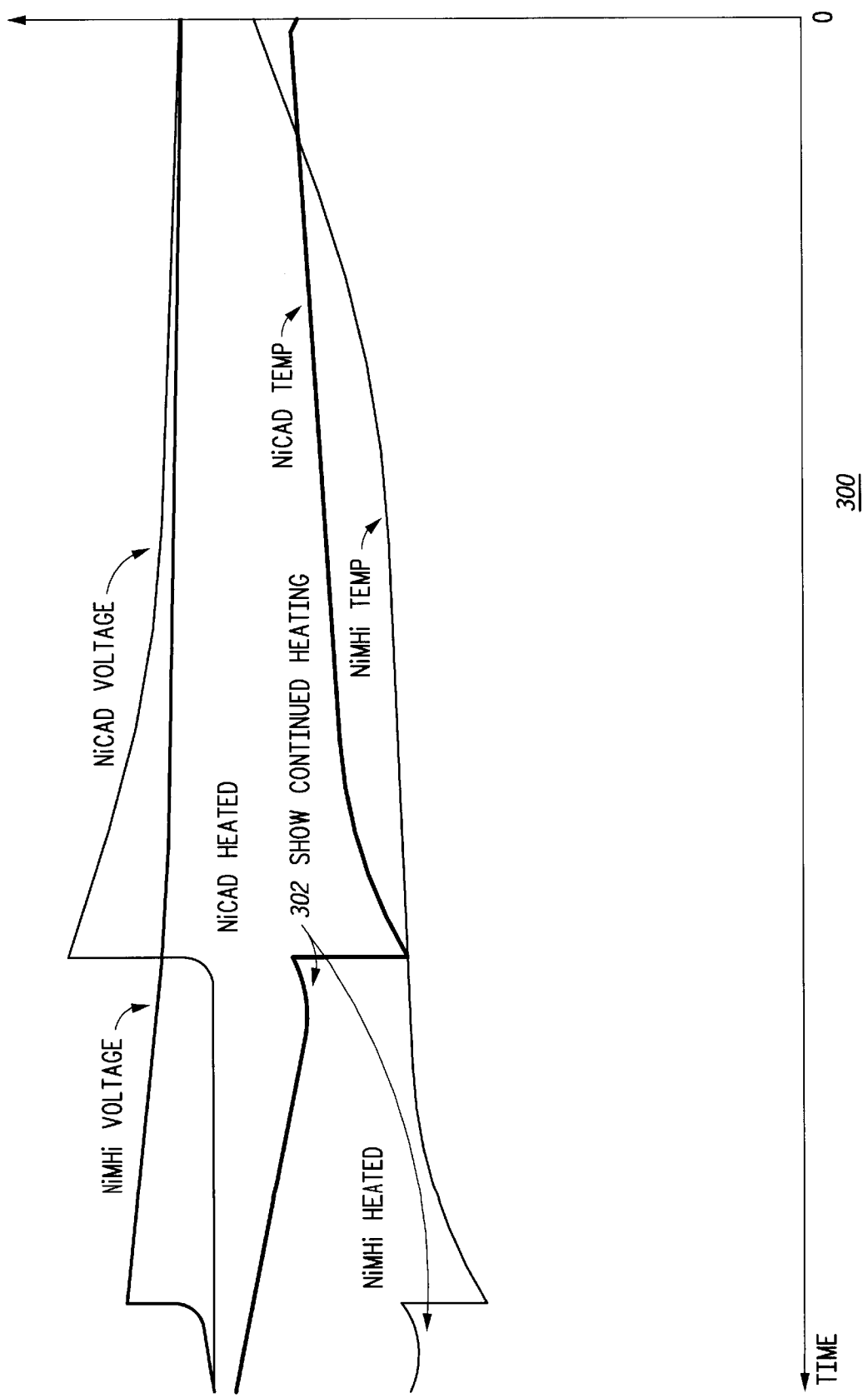
FIG. 3 is a Voltage and Temperature Curve versus time showing that the temperature continues to rise with I=0 when battery properly ΔT/Δt terminates.

Referring now to FIG. 3, the graph of a Voltage and Temperature curve versus time shows how the temperature continues to rise at step 302 for a fully charged battery, with I=0.

Figure 4:
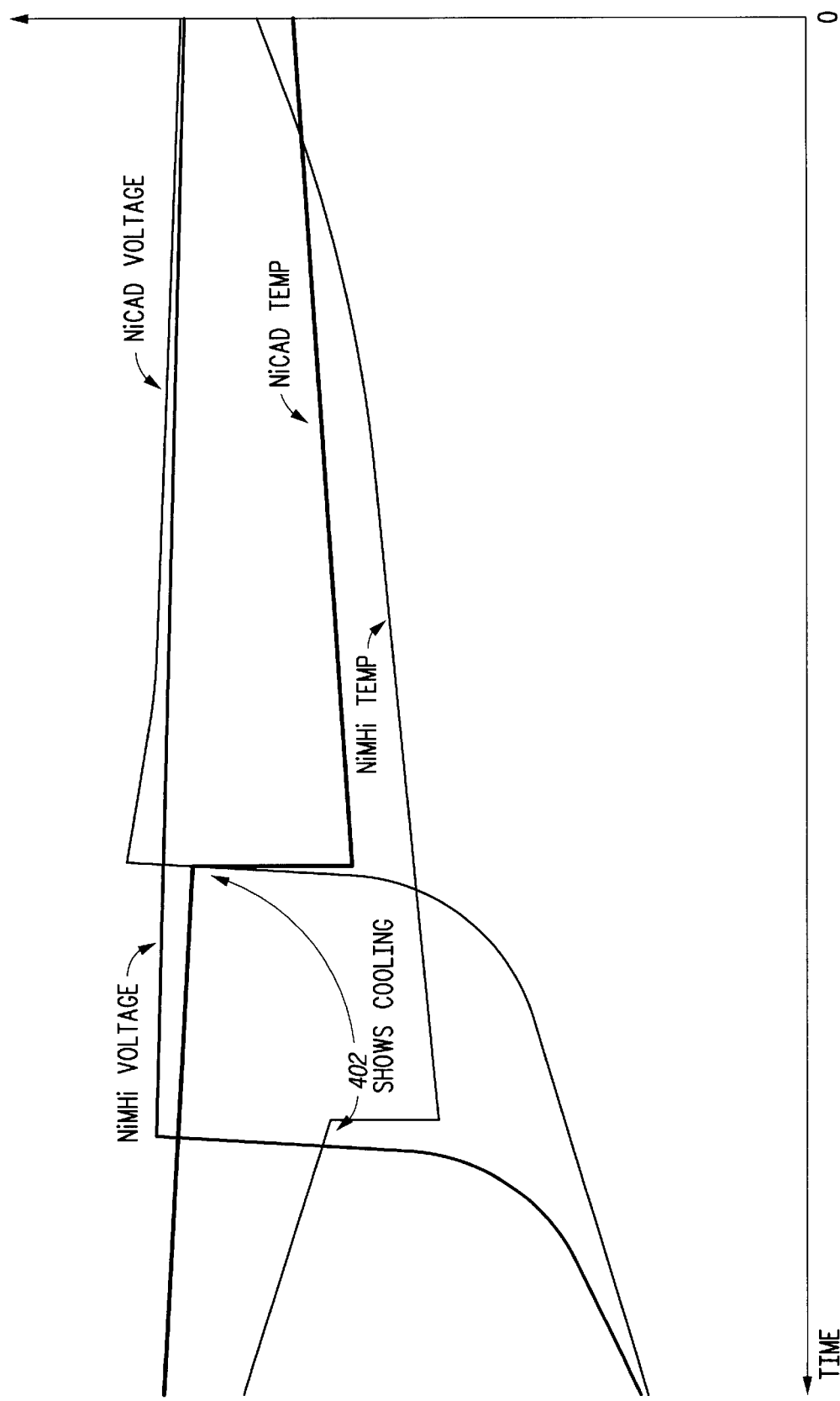
FIG. 4 is a Voltage and Temperature Curve versus time showing that the temperature does not continue to rise with I=0 when battery improperly ΔT/Δt terminates.

Referring now to FIG. 4, the graph of a Voltage and Temperature curve versus time shows how the temperature does not continue to rise at step 402 for a battery that is not fully charged, with I=0.

By determining if the battery temperature continues to rise with the current off, after the dT/dt with current on occurs, the charger can now properly determine if the rapid charge sequence terminated properly or if it prematurely terminated the rapid charge sequence. Because of this, the charger can avoid prematurely terminating the rapid charge sequence and can continue to properly rapid charge the battery, thereby avoiding giving the user a false indication that the battery is fully charged. Furthermore this now allows for higher rapid rate currents for NiMH batteries that would have previously falsely tripped the standard dT/dt termination technique.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been described as pertaining to NiMH batteries, the charging method can be equally applied to any energy storage device that has a positive temperature charge storage coefficient.

What is claimed is:

1. A method or charging a battery, the method comprising the steps of:
   a. providing a rechargeable battery cell;
   b. providing a charger;
   c. recognizing at least one battery characteristic;
   d. testing the battery;
   e. reading a first temperature;
   f. comparing the first temperature to a threshold;
   g. entering a charge mode for a predetermined time;
   h. reading a voltage, comparing the read voltage to a predetermined threshold voltage, and entering a second charge mode where the read voltage exceeds the predetermined threshold voltage;
   i. reading a second temperature at the end of the predetermined time;
   j. calculating a difference between the second temperature and the first temperature divided by the predetermined time;
   k. comparing the difference between the second temperature and the first temperature divided by the predetermined time to a predetermined (dT/dt value; and
   l. reducing charging current when the difference between the second temperature and the first temperature divided by the predetermined time exceeds the predetermined dT/dt value.

2. The method of claim 1, further comprising the steps of:
   a. reading a third temperature;
   b. waiting a predetermined wait time;
   c. reading a fourth temperature;
   d. calculating a difference between the fourth temperature and the third temperature divided by the predetermined wait time;

e. entering a trickle charge mode where the difference between the fourth temperature and the third divided by the predetermined wait time is a positive value.

3. The method of claim 2, further comprising the step of returning to a rapid charge mode where the difference between the fourth temperature and the third divided by the predetermined wait time is a non-positive value.

4. A method of charging a battery, the method comprising the steps of:
   a. charging a battery in a rapid charge mode for a predetermined charge time;
   b. calculating a change in temperature of the battery during predetermined charge time;
   c. calculating a quotient by dividing the change in temperature by the predetermined charge time;
   d. comparing the quotient to a threshold;
   e. reducing charging current where the quotient exceeds the threshold; and
   f. reading a first battery temperature.

5. The method of claim 4, further comprising the steps of:
   a. waiting for a predetermined wait period;
   b. reading a second battery temperature;
   c. subtracting the first battery temperature from the second battery temperature; and
   d. entering a trickle charge mode where the difference of the first battery temperature from the second battery temperature is positive.

6. The method of claim 5, further comprising returning to a rapid charge mode where the difference of the first battery temperature from the second battery temperature is non-positive.

7. A method for charging a battery, the method comprising the steps of:
   a. providing a rechargeable battery cell;
   b. providing a charger;
   c. recognizing at least one battery characteristic;
   d. reading a first temperature;
   e. comparing the first temperature to a threshold; and
   f. entering a first charge mode;
   g. reading a second temperature at the end of a predetermined charge time;
   h. calculating a difference between the second temperature and the first temperature divided by the predetermined charge time;
   i. comparing the difference between the second temperature and the first temperature divided by the predetermined charge time to a predetermined dT/dt value; and
   j. reducing charging current when the difference between the second temperature and the first temperature divided by the predetermined charge time exceeds the predetermined dT/dt value.

8. The method of claim 7, wherein the first charge mode is a rapid charge mode, further comprising reading a first voltage, comparing the read first voltage to a predetermined threshold voltage, and entering a trickle charge mode where a read voltage exceeds the predetermined threshold voltage.

9. The method of claim 7, further comprising monitoring the first temperature, comparing the first temperature to a predetermined threshold temperature, and entering a trickle charge mode when the first temperature exceeds the predetermined threshold temperature.

* * * * *